(12) United States Patent
Brunnabend et al.

(10) Patent No.: US 7,822,721 B2
(45) Date of Patent: Oct. 26, 2010

(54) CORRECTION SERVER FOR LARGE DATABASE SYSTEMS

(75) Inventors: Lutz Brunnabend, Walldorf (DE); Tamas Solyomvari, Budapest (HU); Birgit Wursthorn, Walldorf (DE)

(73) Assignee: SAP AG, Walldorf (DE)

( * ) Notice: Subject to any disclaimer, the term of this patent is extended or adjusted under 35 U.S.C. 154(b) by 1156 days.

(21) Appl. No.: 10/824,437

(22) Filed: Apr. 15, 2004

(65) Prior Publication Data
US 2005/0234918 A1    Oct. 20, 2005

(51) Int. Cl.
G06F 17/00    (2006.01)
(52) U.S. Cl. .................................................. 707/690
(58) Field of Classification Search ................ 707/102, 707/200, 202, 103 R, 690; 714/48–51, 701, 714/702, 718–723
See application file for complete search history.

(56) References Cited

U.S. PATENT DOCUMENTS

| | | | | |
|---|---|---|---|---|
| 5,317,731 A * | 5/1994 | Dias et al. ..................... | 707/8 |
| 5,452,445 A * | 9/1995 | Hallmark et al. ................ | 707/2 |
| 6,219,676 B1 * | 4/2001 | Reiner ......................... | 707/201 |
| 6,286,004 B1 * | 9/2001 | Yoshiura et al. ............... | 707/615 |
| 7,277,905 B2 * | 10/2007 | Randal et al. ................. | 707/648 |
| 2001/0047347 A1 * | 11/2001 | Perell et al. ................... | 707/1 |
| 2002/0188629 A1 * | 12/2002 | Burfoot ....................... | 707/503 |
| 2003/0065584 A1 * | 4/2003 | Takaoka ....................... | 705/26 |
| 2004/0049480 A1 * | 3/2004 | Burrill et al. .................. | 707/1 |
| 2004/0117439 A1 * | 6/2004 | Levett et al. ................... | 709/203 |
| 2005/0033777 A1 * | 2/2005 | Moraes et al. ................. | 707/202 |
| 2005/0075910 A1 * | 4/2005 | Solankl et al. ................. | 705/4 |
| 2005/0097149 A1 * | 5/2005 | Vaitzblit et al. ................ | 707/202 |
| 2005/0192963 A1 * | 9/2005 | Tschiegg et al. ............... | 707/9 |

* cited by examiner

Primary Examiner—Wilson Lee
Assistant Examiner—Michael Le
(74) Attorney, Agent, or Firm—Kenyon & Kenyon LLP

(57) ABSTRACT

A computer system includes a database representing various transactions performed by the system. The number of transactions can be quite large. They may form the basis of analytical processing performed by the computer system, whose results may be used by subsequent stages of analytical processing. When data errors are corrected, the present invention permits a correction server to identify data entities (analytical results or the like) that may now be inconsistent due to the correction. The computer system may include a data flow manager that monitors data flows throughout the system and generates a read history therefrom, identifying reading entities as being dependent on entities from the database. When corrections are made, the corrected database entities are identified in a corrected entity log. If a comparison between the corrected entity log reveals a match with an entry in the read history log, the dependent entity may be identified as possibly inconsistent.

18 Claims, 4 Drawing Sheets

100

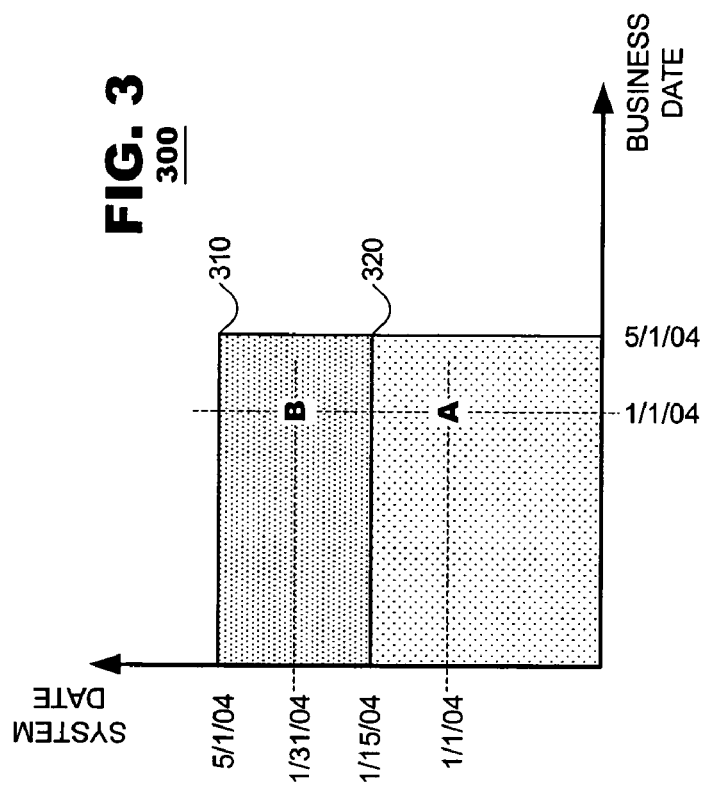
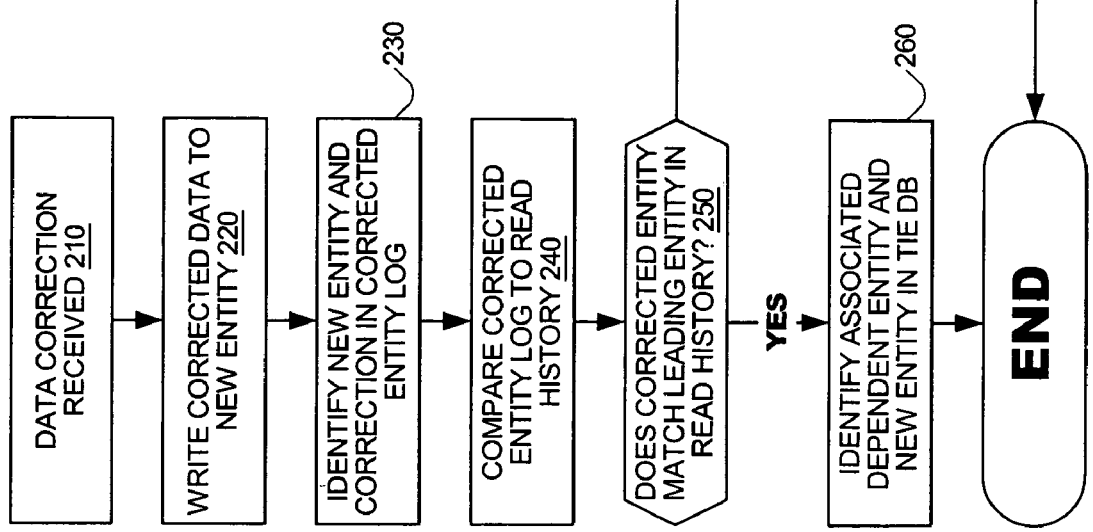

400

500

PRIOR ART

CORRECTION SERVER FOR LARGE DATABASE SYSTEMS

BACKGROUND

Most modern firms employ computer systems to facilitate and manage their operations. Among other things, the computer systems build large databases that store information regarding various transactions performed by the firm, accounts maintained by the firm and the like. Increasingly, the computer systems also include analytical tools to review the firm's records and assess the firm's performance.

Of course, data entry errors are common. Data errors can propagate through various analytical processes performed by a computer system to generate analytical results. Identifying and updating analytical results, particularly when the results are generated from a review of several million database records, is a non-trivial task. Moreover, it is not always apparent whether a database correction will change data generated from the analytical results. Or, if the analytical results are themselves used by other analyzers to generate additional sets of results data, identifying an extent to which a data error causes further data corruption cannot always be ascertained. Therefore, there is a need in the art to develop a data tracking system for computer systems to determine, when data is corrected, which records were corrected and to identify database entities that are dependent on the corrected record.

BRIEF DESCRIPTION OF THE DRAWINGS

FIG. 2 is a flow diagram of a method according to an embodiment of the present invention.

FIG. 3 illustrates a scheme for recording time identifiers according to an embodiment of the present invention.

DETAILED DESCRIPTION

Embodiments of the present invention provide a correction server for use within a computer system to track changes made to database records as they are corrected and to identify database entities that may become temporarily inconsistent as a result of the changes.

Figure 1:
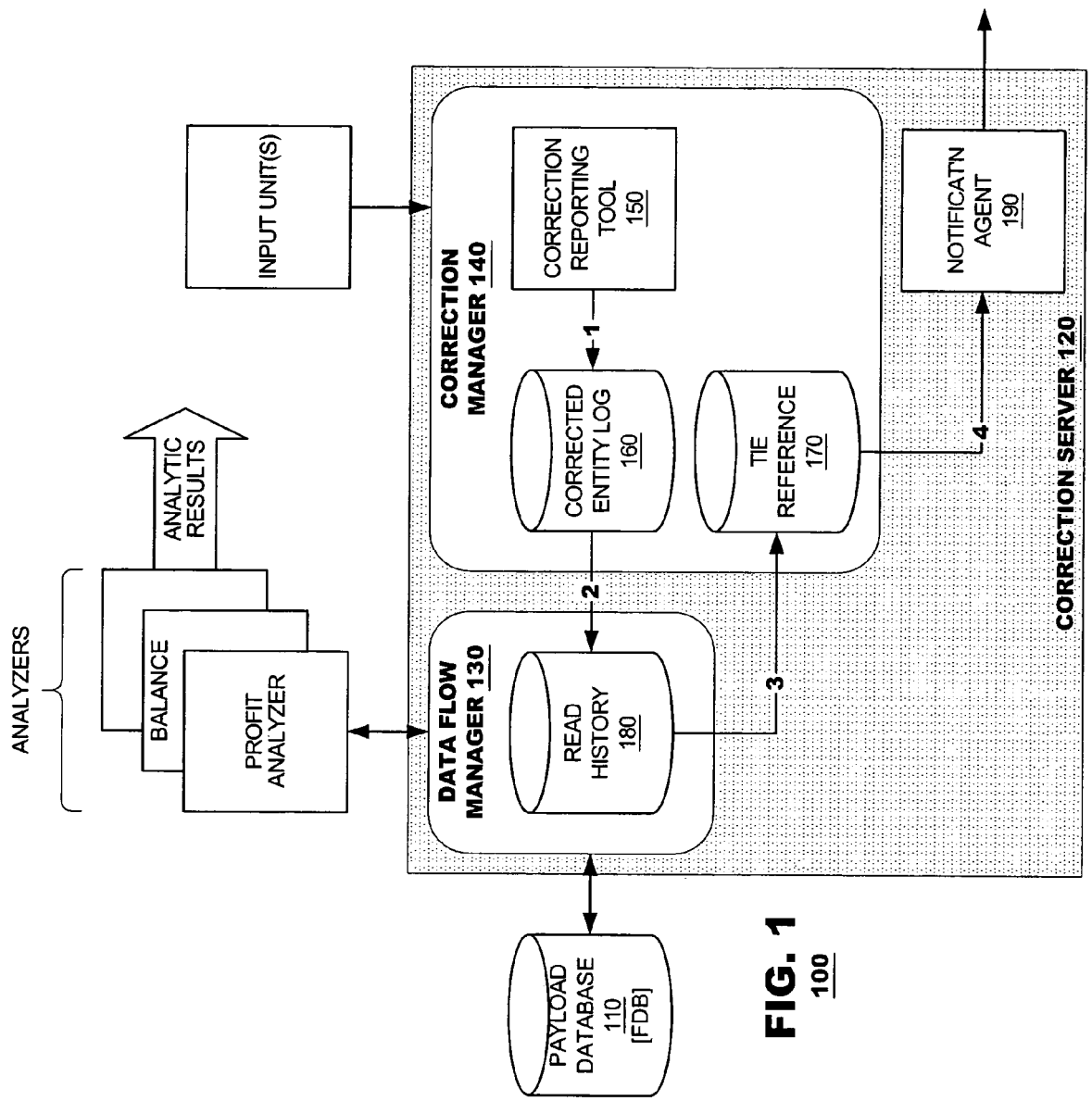
FIG. 1 is a block diagram of a computer system 100 according to an embodiment of the present invention.

FIG. 1 is a block diagram of a computer system 100 according to an embodiment of the present invention. There, the system 100 is shown as including a "payload database" 110 that stores data generated during operation of the computer system 100. The system 100 also includes a correction server 120, which may include a data flow manager 130 and a correction manager 140. The data flow manager 130 manages accesses to the payload database 110 from, for example, various system analyzers or other entities. The data flow manager 130 creates a "read history," a log of accesses identifying each database entity that was read from the payload database 110 and each entity that was created from the database entity. The correction manager 140 manages updates to entities in the payload database and identifies entities in the computer system 100 that may become temporarily inconsistent due to the corrections.

The correction manager 140 may include a correction reporting tool 150 and a pair of databases 160, 170. The first database 160 is a corrected entity log, which maintains a list of all entities that have been corrected subsequent to their creation. The second database 170 identifies "temporarily inconsistent entities," entities within the payload database 110 that may be incorrect because of data corrections.

During operation, data entry operators may generate various database entities through normal data entry procedures established for the computer system 100. Thus, the payload database 110 can be expected to grow to a very large database, storing information regarding possibly millions of transactions of the computer system 100.

System components (such as the analyzers) may read data from the payload database 110 according to their ordinary procedures. Read accesses to the payload database are made via the data flow manager 130, which records them. For each access, the read history database 180 contains a record that identifies the entity read from the payload database (called the "leading entity") and the newly created entity whose component (owner) placed the read request to the data flow manager 130 (the "dependent entity"). Typically, each entity in the computer system is identified by a general unique identifier (called, the GUID). The read history log 180 may record the GUIDs of the leading entity and dependent entity. Thus, the read history database 180 identifies a series of data dependencies between leading entities and dependent entities.

If a data entry error is detected, the data may be corrected. Such processes are handled by the correction manager 140. Corrected information may be entered via an input unit, typically a data terminal or a data transfer from another computer system, and provided to the correction manager 140. In one embodiment, the input unit may identify the correction by providing to the correction manager 140: an identifier of the entity being changed (e.g., its GUID), an identifier of the fields being changed and an identifier of the data changes themselves. A new entry is stored in the corrected entity log 160 with such data.

The new record from the corrected entity log 160 may be compared to the data flow manager's read history log 180 to identify temporarily inconsistent entities. When the corrected entity log 160 identifies a match between the corrected entity and a leading entity listed in the read history 180, it retrieves an identifier of the associated dependent entity for recording in the TIE log 170. It is possible that the dependent entity may be rendered inconsistent due to the data correction. The dependent entity is recorded in the TIE log 170 for further processing. For example, a notification agent 190 may generate e-mail or printed alerts within the computer system 100 to identify the inconsistencies to system operators.

FIG. 2 illustrates a method 200 according to an embodiment of the present invention. When a data correction is received (box 210), the system stores corrected data in a new entity in the payload database (box 220) The corrected entity identifier and the correction is stored in the corrected entity log (box 230). The method compares the corrected entity log to the read history log to determine if the corrected entity is listed as a leading entity in the read history log (boxes 240, 250). If so, the system identifies the leading entity's associated dependent entity as a possibly inconsistent entity (box 260). Thereafter, or if the corrected entity does not match any leading entity in the read history, the method may terminate. All operations in FIG. 2 may be performed as a continuous process in near real time.

Storing data corrections in new entities in the payload database advantageously permits a system operator to run analytical reports both on the corrected data and on the data as it existed on a certain date. FIG. 3 illustrates a multi-dimensional recording scheme 300 that may be used for entities in the payload database 100. For each entity, an operator may be permitted to specific a date, called a "business date," on which a transaction represented by the entity becomes effective. The computer system 100 also assigns another date stamp, called the "system date," to the entity when it is created. System operators may assign other characteristics to entities as they see fit but they are not permitted to specify or modify the system date. Thus, FIG. 3 illustrates an entity A having a business date and a system date of Jan. 1, 2004.

When a data correction is entered, much of an entity's data will be copied to a new entity in the payload database 110. Only the correct data itself will be different. The new entity's system date, however, will be determined by the computer system itself. For example, entity B is shown in FIG. 3 having a business date of Jan. 1, 2004 but a system date of Jan. 31, 2004.

Analyzers and other system components may specify search criteria to select entities from the payload database 110 that feed their processes. As part of the search criteria, the analyzers may specify not only business dates but also system dates of interest. A first search that specifies a business date and a system date of May 1, 2004 or earlier (pt. 310) will capture the corrected entity B. By contrast, a second search that specifies a business date of May 1, 2004 or earlier and a system date of Jan. 15, 2004 or earlier (pt 320) will capture the original entity A. Thus, the system 100 may generate new reports using either current data or data as it existed on a specified date.

Figure 4:
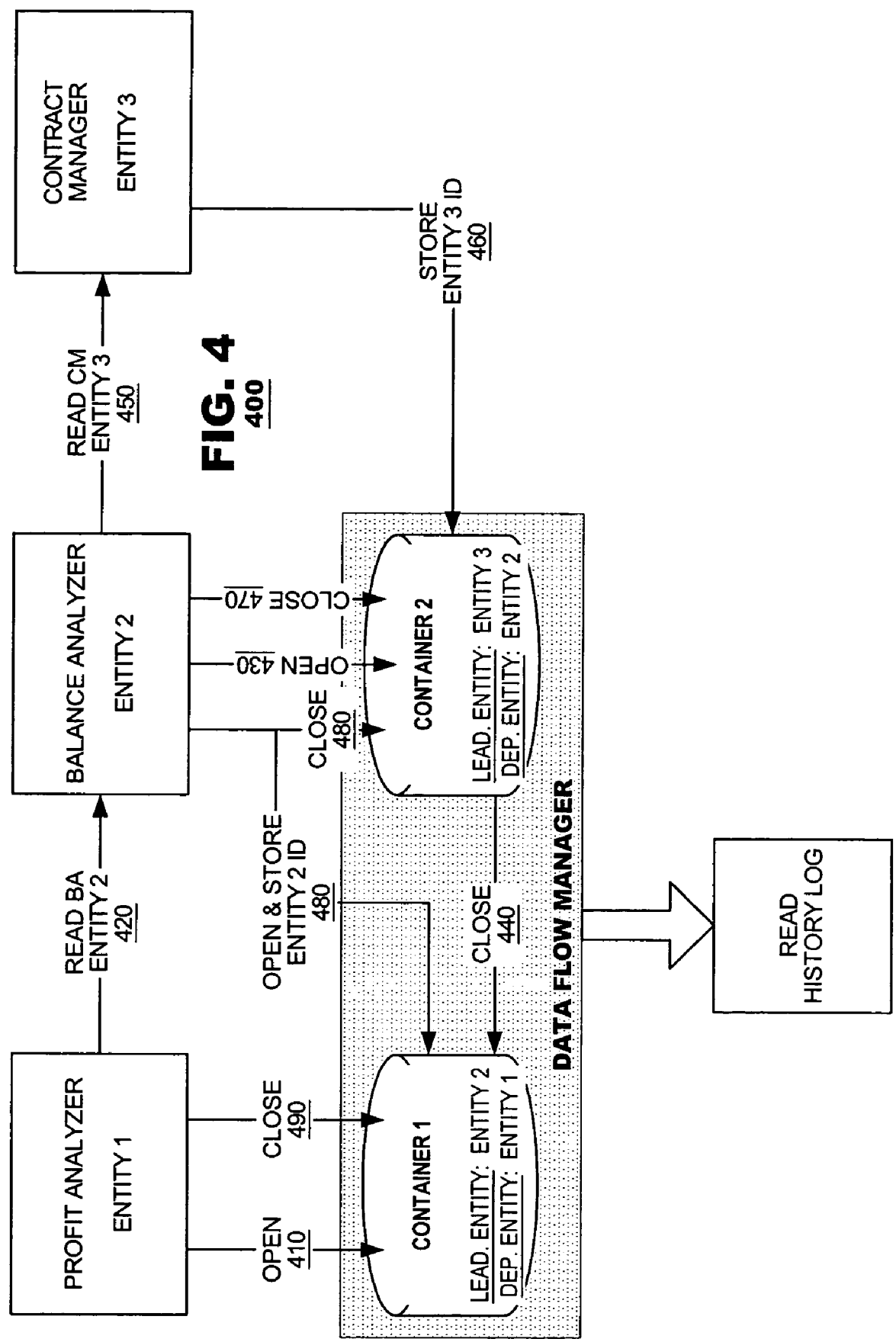
FIG. 4 illustrates operation of a read history log according to an embodiment of the present invention.

FIG. 4 illustrates exemplary data flow throughout the computer system and a corresponding recording operation in a read history database according to an embodiment of the present invention. In this example, a profit analyzer attempts to read data governed by a balance analyzer. To respond with the requested data, however, the bank analyzer requires data from another unit, called the 'contract manager.' Thus, it is possible that a read by a first entity will cause a series of read operations to occur in the computer system 100.

According to an embodiment, when the profit analyzer determines that it will read data from another entity or from the payload database, the profit analyzer communicates with the data flow manager to open a first element of storage, labeled "container 1" (410). By convention, the profit analyzer will read an entity (entity 2) for use in some calculation that will generate data in another entity (entity 1). Container 1 is opened and entity 1 is identified as a dependent entity. The profit analyzer then reads data from the balance analyzer, addressing entity 2 (410).

In response to the read request from the profit analyzer, the balance analyzer determines that it must read another entity (entity 3) before it can respond to the request. The balance analyzer communicates with the data flow manager to open a second element of storage, labeled "container 2" (430). By convention, when one container is opened, it causes another container to close. Thus, the opening of container 2 closes container 1 (440). In container 2, the balance analyzer lists entity 2 as a dependent entity.

The balance analyzer requests a read of entity 3 from the contract manager. As illustrated, the contract manager responds with the requested data. The contract manager also stores an identifier of entity 3 in container 2 as the leading entity. Container 2 thus identifies that entity 2 is dependent upon entity 3. Once the balance analyzer receives the requested data from the contract manager, it may close container 2 (470).

Following the response by the contract manager, the balance analyzer may respond to the read request from the profit analyzer by opening container 1 and storing an ID of entity 2 therein (480). By opening container 1, the balance analyzer also causes container 2 to be closed. At some point after the leading entity is recorded in container 1, the profit analyzer may close container 1 (490). Thereafter, the information of containers 1 and 2 may be recorded in entries of the read history log.

Returning to FIG. 1, the analyzers are illustrated as generating analytical results from their operations on data from the payload database 110. The analytical results themselves may be stored in a database for reference by other analyzers or other system components. Typically, each analyzer is provided its own database for storage of analytic results but, for the purposes of the present discussion, it is sufficient to consider those databases as subsumed within the payload database 110. If a first iteration of the method 200 of FIG. 2 causes a first set of data to be corrected in the payload database 110, an analyzer may operate upon the corrected data and generate analytical results that are corrections to a previously generated set of analytical results. Corrections to the prior set of analytical results may be passed to the correction manager 140 using the same protocol and data formats as are used for corrections received from input units. The corrections may generate a new set of TIE references, which could be corrected by other analyzers. Thus, the method of FIG. 2 may be repeated as data corrections propagate through various processes of the computer system 100 and new results data are returned to the payload database 100.

The read requests and the corresponding responses generate a traceable read history that can be searched to identify data dependencies among the various data entities. Typically, each container may include other system information such as a time stamp indicating when the reads and result creation occurred. Thus, it is possible to relate the time of a data correction to the time of an event recorded the read history to determine if the corrected data renders a read operation possibly inconsistent.

FIG. 4 illustrates only the signaling that may occur between various system entities and the read history log. The entities themselves may be read from the payload database as required and returned to the requestors through data flows that are not illustrated in FIG. 4.

Returning to FIG. 1, the correction reporting tool 150 may provide a system operator to review and interact with contents of the corrected entity log 160 and the TIE log 170. An operator may initiate a session with the correction manager 130 via a user interface. Responsive to a predetermined command, the correction reporting tool 150 may cause contents of the corrected entity log 160, for example, to be retrieved and displayed at an operator's terminal (not shown). Thus, the operator may review the changes that were made. Upon a second command, the correction manager 140 may cause the entirety of the entity to be retrieved from the payload database 110 and displayed. In this form, the operator may review the corrected data in the context of the entire entity. Alternatively, the operator may command the correction manager 140 to retrieve data representing a transaction that caused the correction to be made. Thus, the correction manager 140 may permit an operator to jump to the transaction through which the correction was entered to the system or to jump to the corrected data entity, to review the correction. In this embodiment, the corrected entity log 160 also may store an identifier of the transaction through which the correction was entered (e.g., its GUID).

The correction manager also may include a filtering agent as part of the reporting tool 150. System operators may identify filtering criterion that distinguish corrections that should be stored on the corrected entity log from other corrections that need not be stored. For example, businesses routinely change addresses; such changes could be recorded by a financial organization (e.g., a bank) as a correction. Address changes may not be relevant to the processes of analyzers. Thus, filtering criterion may be defined to exclude non-financial corrections from being recorded in the corrected entity log 160. Additionally, system operators may define filtering criterion to exclude corrections from being recorded if those corrections involve changes in financial amounts of less than some predetermined number (e.g. the difference is less than 100) or the changes are less than some percentage of the originally entered amount (e.g., less than 2%). The filtering criterion will be tailored for the application for which the computer system 100 is to be used.

Figure 5:
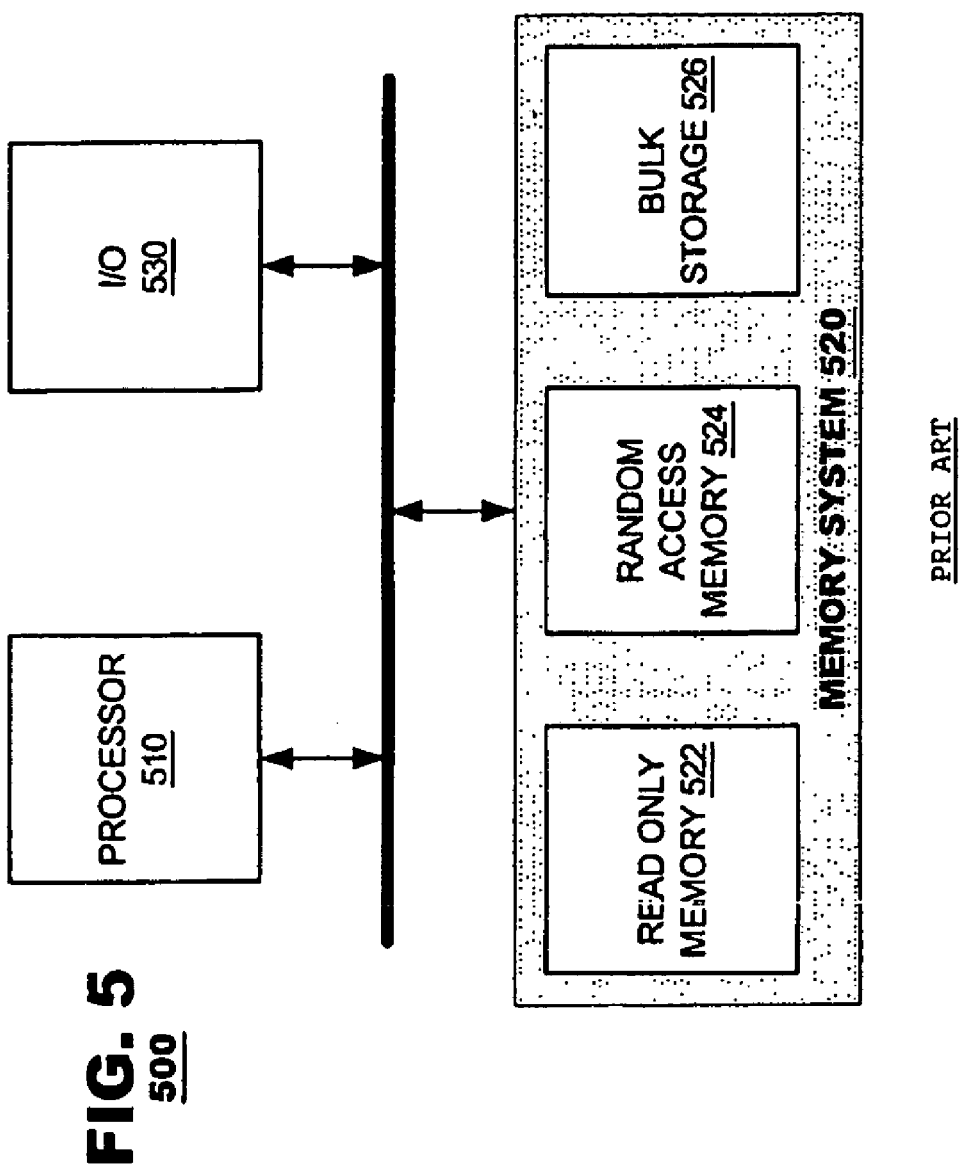
FIG. 5 is a simplified block diagram of a computer system.

The foregoing embodiments may provide a software-implemented system. As such, these embodiments may be represented by program instructions that are to be executed by a server or other common computing platform. One such platform 500 is illustrated in the simplified block diagram of FIG. 5. There, the platform 500 is shown as being populated by a processor 510, a memory system 520 and an input/output (I/O) unit 530. The processor 510 may be any of a plurality of conventional processing systems, including microprocessors, digital signal processors and field programmable logic arrays. In some applications, it may be advantageous to provide multiple processors (not shown) in the platform 500. The processor(s) 510 execute program instructions stored in the memory system. The memory system 520 may include any combination of conventional memory circuits, including electrical, magnetic or optical memory systems. As shown in FIG. 5, the memory system may include read only memories 522, random access memories 524 and bulk storage 526. The memory system not only stores the program instructions representing the various methods described herein but also can store the data items on which these methods operate. The I/O unit 530 would permit communication with external devices (not shown).

The foregoing description refers to the correction management processes as being performed by a correction "server." In the context of the present invention, use of the term "server" is meant to identify a function module executing within a computer system, as opposed to a discrete hardware component of such system. The correction server, therefore, may be provided on a single hardware server either apart from or, more commonly, shared with other function modules of the computer system. Moreover, portions of the correction server 100 may be distributed across multiple hardware servers as a distributed application. The principles of the present invention accommodate all of these embodiments Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A correction server system, comprising:
  a database storing a plurality of data entries;
  a computer system including one or more hardware processor(s) executing program instructions to instantiate:
    one or more analyzers, executed by the processor, to read data entries from the database according to respective read requests and to calculate analytical results therefrom;
    a data flow manager, responsive to read requests from the analyzers, to store data representing the read requests in a read history, the stored data including, for each read request, identifiers of a data entry read and an analytical result generated therefrom; and
    a correction server, responsive to a write to a data entry in the database to correct that data entry, to:
      compare an identifier of the corrected data entry to data entry identifiers stored in the read history and,
      when a match occurs, identify a previously-generated analytical result corresponding to the matching data entry identifier of the read history as rendered potentially inconsistent by the data entry correction.

2. The correction server system of claim 1, wherein the read history log identifies leading and dependent entities, a leading entity being a data entity that is read by a component and a dependent entity being a new object entity created from the data entity that is read.

3. The correction server system of claim 1, wherein the read history stores pairs of entity identifiers.

4. The correction server system of claim 1, wherein the correction server receives correction data that includes an identifier of a data entity being corrected, an indication of fields within the data entity that are being changed and an identification of field values that are changed.

5. The correction server system of claim 4, wherein a corrected entity log stores all the correction data.

6. The correction server system of claim 1, wherein the correction server further comprises a filtering agent that compares correction information to filtering criterion and stores the correction information in a corrected entity log only if the correction information matches the filtering criterion.

7. The correction server system of claim 1, wherein the correction server further includes a user interface that permits review and display of a corrected entity log, the user interface providing a jump-to feature that, when activated with respect to an entry of the corrected entity log causes a data entity referenced by the entry to be retrieved and displayed.

8. The correction server system of claim 1, wherein the read history is stored in a persistent context.

9. A computer-implemented correction management method, comprising:
  responsive to each of a plurality of read requests to a database by analyzers to process database data entries, storing with a computer hardware processor, in a read history:
    an identifier of the data entry being read pursuant to the read request and an identifier of an analytical result generated by the respective analyzer after having processed the data entry,
  responsive to a write operation to the database to correct a data entry therein:
    comparing with the computer hardware processor an identifier of the corrected data entry to data entry identifiers stored in the read history, and
  when a match occurs, identifying a previously-generated analytical result corresponding to the matching data entry identifier of the read history as rendered potentially inconsistent by the data entry correction.

10. The correction management method of claim 9, wherein the read history stores paired leading entity identifiers and dependent entity identifiers relating to the prior accesses.

11. The correction management method of claim 10, wherein the comparison is made between an entity identifier from a corrected entity log and the leading entity identifier from the read history log.

12. The correction management method of claim 9, wherein the read history is stored in a persistent context.

13. Computer readable medium having stored thereon program instructions that, when executed, cause a computer system to:

responsive to each of a plurality of read requests to a database by analyzers to process database data entries, storing with a computer hardware processor, in a read history:
an identifier of the data entry being read pursuant to the read request and an identifier of an analytical result generated by the respective analyzer after having processed the data entry,
responsive to a write operation to the database to correct a data entry therein:
comparing with the computer hardware processor an identifier of the corrected data entry to data entry identifiers stored in the read history, and
when a match occurs, identifying a previously-generated analytical result corresponding to the matching data entry identifier of the read history as rendered potentially inconsistent by the data entry correction.

14. The medium of claim 13, wherein the read history stores paired leading entity identifiers and dependent entity identifiers relating to the prior read requests.

15. The medium of claim 13, wherein the write operation includes an entry identifier of a database entry and an indication of fields within the database entry being corrected.

16. The medium of claim 13, further comprising comparing the request to correct the data entry to filtering criteria and performing the storing and comparing unless the request to correct the data entry does not satisfy the filtering criteria.

17. A correction server system, comprising:
an electronic processor and a memory;
a database in the memory, storing a plurality of data entries;
an analyzer, executed by the processor, to read a data entry and calculate an analytical result using the data entry;
a data flow manager, responsive to read requests from agents to the database, to store a read history including, for each read request: identifying a relationship between a particular data entry read and a particular analytical result; and
a correction server, responsive to the particular data entry being corrected, identifying each related analytical result as rendered potentially inconsistent.

18. A method, comprising:
maintaining a plurality of data entries in a database;
monitoring a plurality of agents to a database configured to read the plurality of data entries, wherein the monitoring is performed by an electronic processor and includes: for each read operation of a particular data entry:
storing a link between the particular data entry and an analytical result using the particular data entry;
responsive to a data entry being corrected, identifying each analytical result linked to the corrected data entry as being rendered potentially inconsistent.

* * * * *